United States Patent
Christman et al.

(10) Patent No.: US 9,376,104 B2
(45) Date of Patent: Jun. 28, 2016

(54) ENGINE AUTOSTART SOURCE SELECTION

(71) Applicant: GM GLOBAL TECHNOLOGY OPERATIONS LLC, Detroit, MI (US)

(72) Inventors: Anthony Christman, Madison Heights, MI (US); Karl Andrew Sime, Mason, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 145 days.

(21) Appl. No.: 14/173,189

(22) Filed: Feb. 5, 2014

(65) Prior Publication Data

US 2015/0217761 A1 Aug. 6, 2015

(51) Int. Cl.
*B60W 20/00* (2006.01)
*F02N 11/08* (2006.01)
*F02N 15/02* (2006.01)
*F02N 11/00* (2006.01)
*F02N 11/04* (2006.01)

(52) U.S. Cl.
CPC ........... *B60W 20/40* (2013.01); *F02N 11/0825* (2013.01); *F02N 11/0862* (2013.01); *F02N 11/006* (2013.01); *F02N 11/04* (2013.01); *F02N 11/0814* (2013.01); *F02N 11/0855* (2013.01); *F02N 15/02* (2013.01); *F02N 2011/0888* (2013.01); *F02N 2011/0896* (2013.01); *F02N 2200/021* (2013.01); *F02N 2200/061* (2013.01); *Y02T 10/48* (2013.01)

(58) Field of Classification Search
CPC .................... B60W 10/06; B60W 2510/0657; B60L 11/14; F02N 11/0814; F02N 15/067; F02N 11/0855; F02N 15/02; F02N 2200/022; Y02T 10/7258; Y02T 10/7283; Y02T 10/48
See application file for complete search history.

(56) References Cited

U.S. PATENT DOCUMENTS

| 7,689,331 B2 * | 3/2010 | Moran ..................... B60K 6/12 180/65.245 |
| 8,157,035 B2 * | 4/2012 | Whitney ................ B60K 6/365 180/65.265 |
| 8,757,120 B2 * | 6/2014 | Kitano ................ F02N 11/0814 123/179.25 |
| 2002/0093202 A1 * | 7/2002 | Downs ................... B60K 6/485 290/40 R |
| 2009/0271057 A1 | 10/2009 | Stone |
| 2010/0038158 A1 * | 2/2010 | Whitney ................ B60K 6/485 180/65.265 |

(Continued)

FOREIGN PATENT DOCUMENTS

DE 102010010124 A1 11/2010
DE 102010050123 A1 5/2012

*Primary Examiner* — James Trammell
*Assistant Examiner* — Demetra Smith-Stewart
(74) *Attorney, Agent, or Firm* — Quinn Law Group, PLLC

(57) ABSTRACT

A vehicle includes an engine, a transmission, and an electrical system. The electrical system has an auxiliary starter motor connected to a crankshaft of the engine, a high-voltage motor generator unit (MGU) connected to the crankshaft, and a controller. Execution of instructions by a processor causes the controller to determine a set of powertrain conditions in response to a requested autostart of the engine, e.g., state of charge and/or power limits of a high-voltage energy storage system (HV-ESS), torque limits of the MGU, and/or a crank angle of the engine. The controller determines whether the requested autostart may not succeed relative to a time or noise standard using the set of powertrain conditions, and transmits an autostart command to the MGU when the requested autostart may succeed. The controller transmits the autostart command to the auxiliary starter motor when the requested autostart will not succeed.

14 Claims, 2 Drawing Sheets

(56) References Cited

U.S. PATENT DOCUMENTS

| | | | |
|---|---|---|---|
| 2010/0225258 A1 | 9/2010 | Namuduri et al. | |
| 2011/0155085 A1* | 6/2011 | Hirano | F02N 11/0844 123/179.3 |
| 2011/0253099 A1* | 10/2011 | Han | F02D 41/0097 123/350 |
| 2012/0303189 A1* | 11/2012 | Namuduri | B60W 20/00 701/22 |
| 2013/0072348 A1* | 3/2013 | Lochocki, Jr. | B60W 10/06 477/54 |
| 2013/0179055 A1* | 7/2013 | Kato | B60K 6/48 701/113 |
| 2014/0257607 A1* | 9/2014 | Van Maanen | F16D 48/06 701/22 |

* cited by examiner

ENGINE AUTOSTART SOURCE SELECTION

TECHNICAL FIELD

The present disclosure relates to engine autostart source selection.

BACKGROUND

In a hybrid electric vehicle having a belted alternator starter (BAS) system, a high-voltage motor generator unit (MGU) is operatively connected to a crankshaft of an internal combustion engine via a belt and pulley. The MGU draws power from a high-voltage battery. Output torque from the MGU is used to crank and start the engine. Such functionality, which is typically provided in both mild and full hybrid powertrain designs, is referred to as engine "autostart". The ability to selectively turn off the engine during idle conditions is thus referred to as engine "autostop". The ability to shut off and restart the engine at idle is just one way in which hybrid electric powertrains achieve their superior fuel economy relative to conventional powertrains.

SUMMARY

A hybrid vehicle is disclosed herein. The vehicle has an internal combustion engine, a transmission, and an electrical system. The electrical system includes a controller, a high-voltage electric machine such as a motor generator unit (MGU), a high-voltage energy storage system (HV-ESS), an auxiliary starter motor, and a low-voltage auxiliary energy storage system (LV-ESS). As used herein, the term "high-voltage" refers to voltage levels of about 30 VDC or more, while "low-voltage" refers to auxiliary voltage aboard the vehicle, typically 12-15 VDC. As is well known in the art, the use of high-voltage electrical components aboard a vehicle requires voltage isolation design features to ensure the chassis of the vehicle is not electrified in the event of a fault condition. Thus, any voltage sources, busses, or electrical components requiring such voltage isolation may be considered, for the purposes of the present disclosure, to be high-voltage devices. Likewise, any voltage sources, busses, or electrical components not requiring such voltage isolation may be considered to be auxiliary or low-voltage devices.

The controller of the present invention determines, in advance of an engine autostart event, whether to use the auxiliary starter motor or the high-voltage electric machine as the source of torque for cranking and starting the engine. As evolving high-voltage batteries and electric machines decrease in size so as to reduce cost, mass, and packaging space, some engine autostart events may be unsatisfactory, for instance in duration and/or in noise/harshness. This result may be due to insufficient high-voltage battery power or available motor torque necessary to spin up the engine, or it may be due to the engine stopping at a less than optimum cranking angle. For instance, the engine may stop in an undesirable position after an autostop event, such that available motor torque or battery power may be insufficient to overcome the first or second compression pulse of an autostart event.

Rather than waiting for a high-voltage autostart event to not succeed relative to a time or harshness standard before commanding a backup start via the auxiliary starter motor in the conventional manner, the controller described herein is programmed to command an autostart via the auxiliary starter motor from the outset if an evaluation of various powertrain values indicates that the high-voltage autostart may time out or otherwise not succeed relative to a particular standard, whether that be in duration or in noise/harshness. As a result, the output torque delay typically experienced by a driver waiting for the engine to restart may be minimized at throttle tip-in, as the controller is not first attempting to conduct the autostart event via the high-voltage electric machine, waiting for this high-voltage autostart event to time out, and then defaulting to an autostart via the auxiliary starter motor.

Additionally, for hybrid powertrains using a hydraulic accumulator to provide pressure to the transmission upon engine autostart, hydraulic pressure from the accumulator may be largely depleted by the time the high-voltage autostart fails to complete. The low-voltage backup auxiliary starter motor may produce a driveline disturbance during a backup auxiliary autostart. By engaging the auxiliary starter motor while hydraulic pressure remains in the accumulator, this undesirable situation may be largely avoided.

In an example embodiment, the vehicle includes an engine, a transmission, and an electrical system as noted above. The transmission includes an input member that is selectively connectable to a crankshaft of the engine. The electrical system includes an auxiliary starter motor connected to the crankshaft, a high-voltage electric machine connected to the crankshaft, and a controller. The controller includes a processor and tangible, non-transitory memory on which is recorded instructions for selecting one of the auxiliary starter motor and the high-voltage electric machine as a source for starting the engine during a requested autostart of the engine.

Execution of the instructions by the processor causes the controller to determine a set of powertrain conditions in response to a requested autostart of the engine, and to determine whether the requested autostart will not succeed, e.g., relative to a time or noise standard, using the set of powertrain conditions. The controller then transmits an autostart command to the high-voltage electric machine when the controller has determined that the requested autostart will succeed relative to the time or noise standard. The controller transmits the autostart command to the auxiliary starter motor in the alternative when the requested autostart will not succeed relative to the time or noise standard.

A controller for a vehicle is also disclosed, with the vehicle in this embodiment likewise having an engine, an auxiliary starter motor, and a high-voltage electric machine each operable to start the engine. The controller includes a processor and tangible, non-transitory memory on which is recorded instructions for selecting one of the auxiliary starter motor and the high-voltage electric machine as a source for starting the engine during a requested autostart of the engine. Execution of the instructions by the processor causes the controller to determine a set of powertrain conditions in response to a requested autostart of the engine, and determine whether the requested autostart will not succeed relative to a time or noise standard using the set of powertrain conditions. Execution of the instructions also causes the controller to transmit an autostart command to the high-voltage electric machine when the requested autostart will succeed relative to the time or noise standard, and to transmit the autostart command to the auxiliary starter motor when the requested autostart will not succeed relative to the time or noise standard.

In another embodiment, a vehicle includes an engine, a belt, a pair of pulleys, a transmission, and an electrical system. The engine includes a crankshaft, and the transmission includes an input member that is selectively connectable to the crankshaft. The electrical system in this embodiment includes an auxiliary starter motor connected to the crankshaft, a polyphase high-voltage energy storage system (HV-ESS), an auxiliary power module (APM), and an auxiliary energy storage system (LV-ESS) electrically connected to one side of the APM. The same electrical system also includes a power inverter module (PIM) electrically connected to another side of the APM, and a high-voltage electric machine in the form of a motor generator unit (MGU) that is connected to the crankshaft via the belt and the pair of pulleys, and electrically connected to the HV-ESS via the PIM. The controller noted above is included as part of this example embodiment.

The above features and advantages and other features and advantages of the present invention are readily apparent from the following detailed description of the best modes for carrying out the invention when taken in connection with the accompanying drawings.

DETAILED DESCRIPTION

Figure 1:
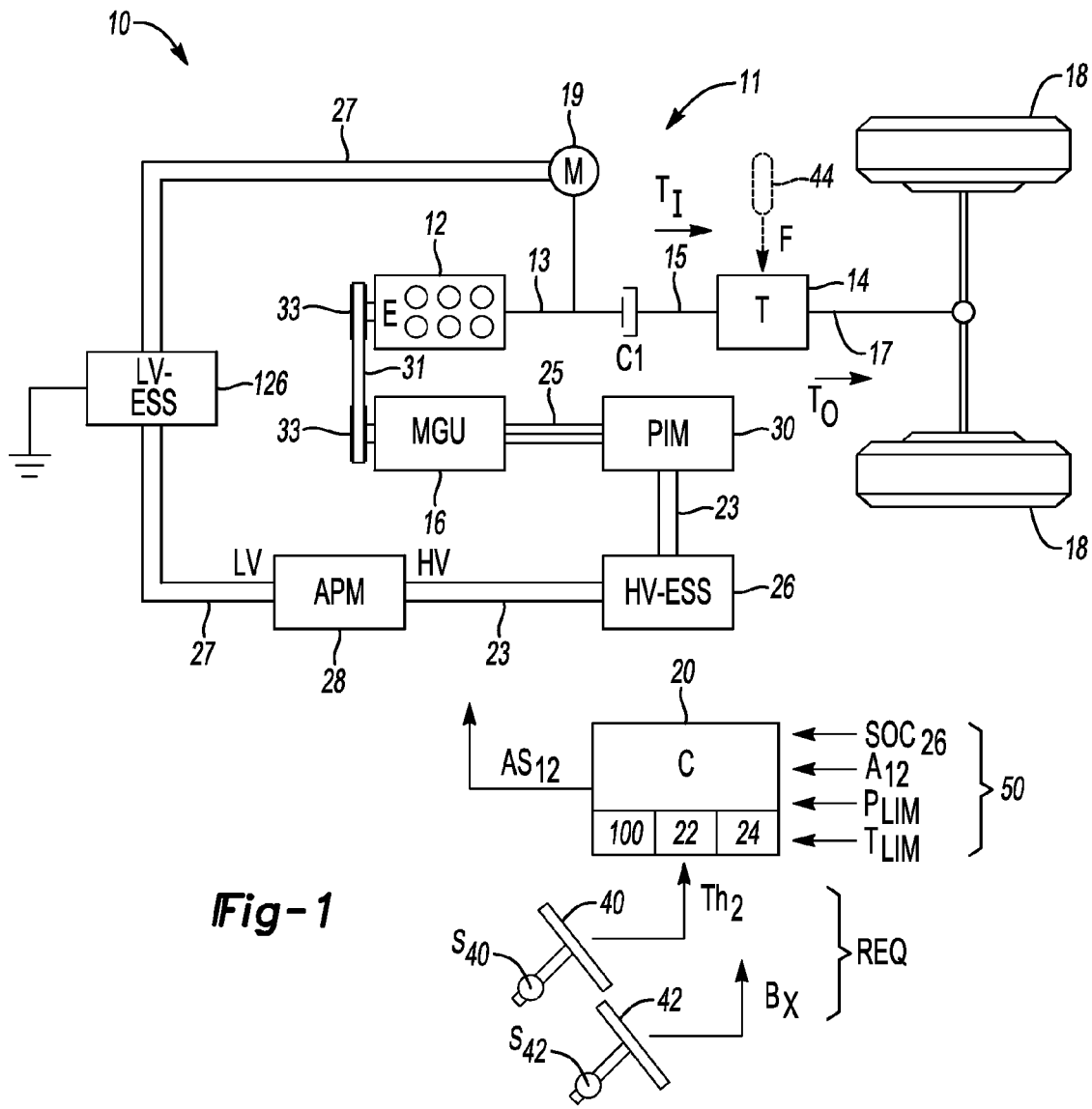
FIG. 1 is a schematic illustration of a vehicle having an engine, an auxiliary starter motor, and a high-voltage motor generator unit each operable for restarting the engine, and a controller with engine autostart source selection functionality as set forth herein.

Referring to the drawings, wherein like reference numbers refer to like components throughout the several views, an example vehicle 10 is shown schematically in FIG. 1. The vehicle 10 includes a hybrid powertrain 11, which in turn includes an internal combustion engine (E) 12 and a transmission (T) 14. The engine 12 includes a crankshaft 13 that is operatively connected to an input member 15 of the transmission 14. In some embodiments, such as the example embodiment of FIG. 1, an input clutch C1 may be used to selectively disconnect the engine 12 from the input member 15 of the transmission 14, e.g., to reduce driveline disturbances while starting the engine 12.

The transmission 14 may include a gearing arrangement and clutches (not shown) through which torque flows from the input member 15 to an output member 17 of the transmission 14, and ultimately to drive wheels 18 of the vehicle 10, two of which are shown in FIG. 1. The drive wheels 18 may be front drive wheels or rear drive wheels. A second pair of drive wheels (not shown) may be powered by the hybrid powertrain 11 in a four wheel or all wheel drive mode, or the additional wheels may be unpowered.

As shown in phantom, the vehicle 10 may include an optional hydraulic accumulator 44 that provides fluid pressure (arrow F) to the transmission 14 as needed, such as when the engine 12 is off. The hydraulic accumulator 44 may deliver fluid pressure to the transmission 14 over a transient period when the engine 12 is restarting. An engine-drive main pump (not shown) may then provide hydraulic pressure to the transmission 14 when the engine 12 is running. Other embodiments may forego the hydraulic accumulator 44 in favor of an auxiliary transmission pump (not shown).

Within the intended scope of the present invention, the vehicle 10 includes two different sources for starting the engine 12 during an autostart event: a high-voltage high-voltage (HV) electric machine 16, e.g., a motor generator unit (MGU) or a high-voltage motor, and an auxiliary starter motor (M) 19. The auxiliary starter motor (M) 19 is operatively connectable to the crankshaft 13, e.g., through a gear train (not shown). The HV electric machine 16 is likewise connected to the crankshaft 13, for instance via a drive belt 31 and set of pulleys 33 in an example belted alternator starter (BAS) system. The HV electric machine 16 may be embodied as a polyphase AC permanent magnet-type or induction-type electric machine rated for 30-300 VDC or more depending on the design, while the auxiliary starter motor 19 is a conventional 12-15 VDC auxiliary motor device.

The vehicle 10 of FIG. 1 also includes a high-voltage energy storage system (HV-ESS) 26 and an auxiliary/low-voltage energy storage system (LV-ESS) 126. The LV-ESS 126 may be connected to the HV-ESS 26 via an auxiliary power module (APM) 28, i.e., a DC-DC converter and voltage regulator of the type known in the art. The APM 28 is operable to reduce the magnitude of voltage delivered via a high-voltage DC bus 23 from the HV-ESS 26 to auxiliary voltage levels, typically 12-15 VDC, with the auxiliary voltage made available to the LV-ESS 126 via a low-voltage DC bus 27. The auxiliary starter motor 19 is connected to the LV-ESS 126 via the same low-voltage DC bus 27.

The HV electric machine 16, when configured as a polyphase electric motor or MGU, may be connected to a power inverter module (PIM) 30 via a high-voltage AC bus 25. The PIM 30 may include dies or blocks of semi-conductor switches such as MOSFETs or IGBTs, which may be switched on and off as needed within the PIM 30 via commands from a controller (C) 20 or another control device to convert the DC voltage from the HV-ESS 26 to a polyphase AC voltage suitable for powering the HV electric machine 16.

Still referring to FIG. 1, the controller 20 may be configured as one or more digital computer devices including a processor 22 and tangible, non-transitory memory 24, e.g., non-volatile read only memory (ROM) in the form of magnetic memory, optical memory, flash memory, and the like. The controller 20 may also include sufficient amounts of random access memory (RAM), electrically-erasable programmable read only memory (EEPROM), and buffers, as well as a high-speed clock or oscillator, analog-to-digital (A/D) and digital-to-analog (D/A) circuitry, input/output circuitry and devices (I/O), and appropriate signal conditioning and buffer circuitry. Any control algorithms resident in the controller 20 or accessible by the controller 20, including instructions embodying an auto start source selection method 100 as described below, may be stored in memory 24 and executed via the processor 22 to provide the desired functionality.

The controller 20 is in communication with the various components of the vehicle 10. In some embodiments, the controller 20 may be an engine control module (ECM) operable to control all functionality of the engine 12. In other embodiments, the controller 20 could be a separate controller limited to execution of the method 100. In all embodiments, the controller 20 receives or is made aware of an autostart request (REQ), for instance via a driver's depression of an accelerator pedal 40 having a sensor $S_{40}$ which measures the force or travel of the accelerator pedal 40. A threshold force or travel, possibly coupled with a discontinuation of a braking force (arrow $B_X$) applied to a brake pedal 42 as measured by a sensor $S_{42}$, may indicate that the autostart request (REQ) is active.

As part of the method 100, the controller 20 of FIG. 1 is also made aware of a set of powertrain conditions 50. The controller 20, prior to executing an autostart of the engine 12, processes the set of powertrain conditions 50 and determines which of the two autostart sources, i.e., the auxiliary starter motor 19 or the HV electric machine 16, to use as a source of motor torque in cranking and starting the engine 12. As a result, the controller 20 is able to determine in advance whether a high-voltage autostart is likely not to succeed relative to a standard, either of duration or harshness, thus selectively avoiding this type of restart. The controller 20 commands an autostart of the engine 12 via transmission of an autostart control signal (arrow $AS_{12}$) to a selected one of the two sources, i.e., either the auxiliary starter motor 19 or the HV electric machine 16. Example variables that may be considered by the controller 20 in making this control decision may include the state of charge (SOC) of the HV-ESS 26, power limits ($P_{LIM}$) of the HV-ESS 26, torque limits ($T_{LIM}$) of the HV electric machine 16, and/or a crank angle ($A_{12}$) of the engine 12.

As is known in the art, the crank angle ($A_{12}$) refers to the angular position of the crankshaft 13 with respect to a top dead center (TDC) position of a piston bore of the engine 12. The crank angle ($A_{12}$) may be determined by the controller 20, for instance by reading a 60-2 tooth wheel attached to the crankshaft 13, possibly in conjunction with cam angle sensors (not shown) reading a cam trigger wheel as is known in the art. Alternatively, crank angle could be calculated and monitored using predetermined design parameters of the engine 12 and tracking the changing crank angle over time. Given the formula $l^2 = r^2 + x^2 - 2rx \cos(A_{12})$, the crank angle $A_{12}$ can be readily determined, where l is the distance between a piston pin and a crank pin in the engine 12, r is the crank radius, and x is the piston pin position upward from crank center along cylinder bore centerline. The SOC of the HV-ESS 26 is the available capacity of the HV-ESS 26, typically expressed as a percentage of a maximum SOC. The power limit ($P_{LIM}$) of the HV-ESS 26 refers to the maximum power available from the HV-ESS 26, which defines the charge and discharge limits of the HV-ESS 26. The torque limit ($T_{LIM}$) describes the maximum positive and negative torque output from the HV electric machine 16 given the various conditions of the HV-ESS 26 and the known rating of the HV-ESS 26 and the HV electric machine 16.

Figure 2:
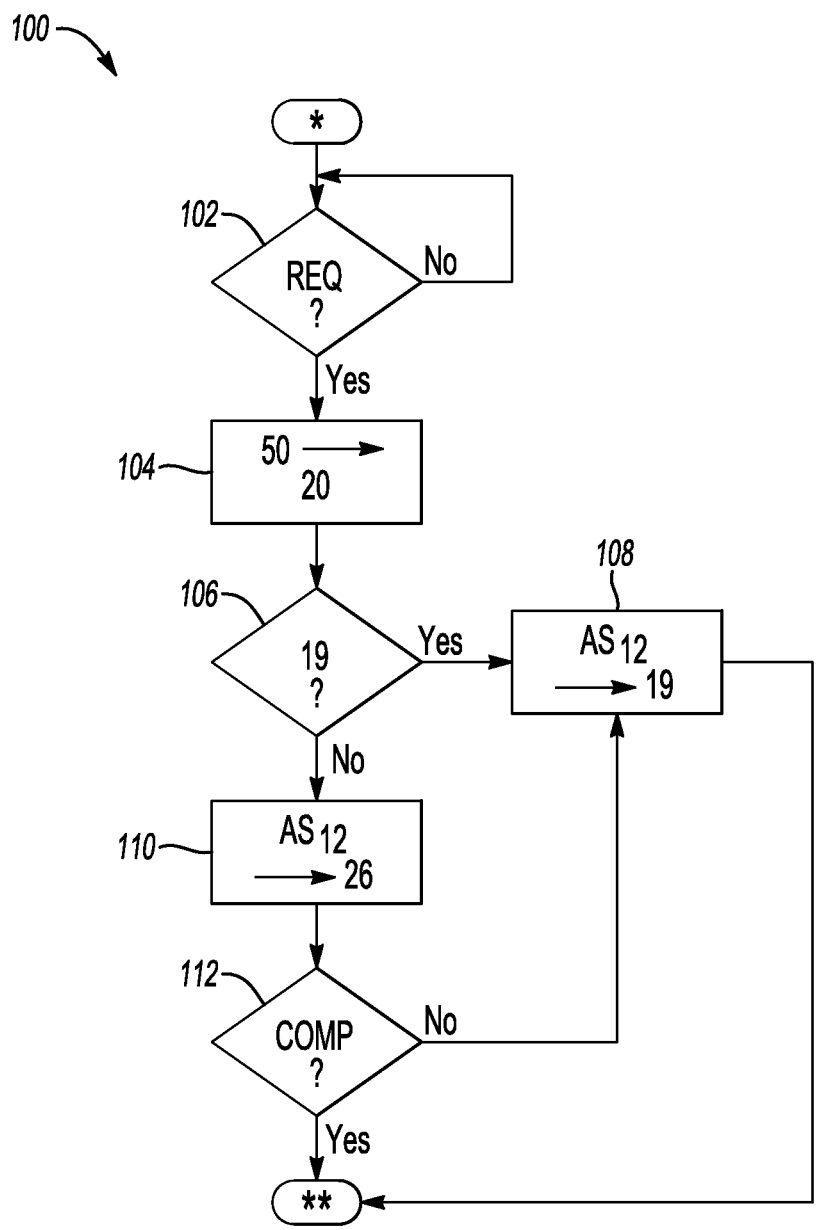
FIG. 2 is a flow chart describing an example method for selecting an engine autostart source aboard the vehicle of FIG. 1.

FIG. 2 describes an example method 100 for selecting an engine autostart source aboard the vehicle 10 of FIG. 1. After initialization (*), such as after an autostop event when the engine 12 is in an off state, at step 102 the controller 20 of FIG. 1 determines whether an autostart request (REQ of FIG. 1) is active, such as by comparing the apply force or travel of the accelerator pedal 40 and/or a braking force or travel of the brake pedal 42 to calibrated thresholds. The method 100 proceeds to step 104 when an autostart request is received.

Step 104 entails determining the set of powertrain conditions 50 of FIG. 1 via the controller 20. Step 104 may include processing any or all of the example conditions shown in FIG. 1, such as the SOC and power limits of the HV-ESS 26, the torque limits of the HV electric machine 16, and the crank angle $A_{12}$ of the engine 12. The controller 20 proceeds to step 106 once the set of powertrain conditions 50 has been determined.

At step 106, the controller 20 of FIG. 1 next makes a decision as to which of the auxiliary starter motor 19 and the HV electric machine 16 of FIG. 1 to use in starting the engine 12 during a requested autostart event. The controller 20 proceeds to step 108 when the set of powertrain conditions 50 indicates that an autostart powered via the HV electric machine 16 may not complete in a calibrated maximum threshold time, or may complete within the threshold but, given the level of one or more of the powertrain conditions 50, may do so with less than satisfactory levels of noise, vibration, and harshnesss. Otherwise, the method 100 proceeds to step 110.

At step 108, the controller 20 of FIG. 1 transmits the autostart command (arrow $AS_{12}$ of FIG. 1) to the auxiliary starter motor 19. Step 108 may also include activating a control solenoid (not shown) of the auxiliary starter motor 19 in response to the autostart command to energize the auxiliary starter motor 19 via the low-voltage DC bus 27 of FIG. 1. The engine 12 is thus started via the auxiliary starter motor 19. Once the engine 12 is running, control of the vehicle 10 per the method 100 is complete (**).

Step 110 includes transmitting the autostart command (arrow $AS_{12}$ of FIG. 1) to the HV electric machine 16. Step 110 may also include activating the PIM 30 shown in FIG. 1 in response to the autostart command so as to energize the HV electric machine 16 via the high-voltage AC bus 25 of FIG. 1. The engine 12 is thus started via the HV electric machine 16. The method 100 then proceeds to step 112.

At step 112, the controller 20 determines whether the autostart commanded at step 110 has completed within a calibrated maximum duration. If so, the method 100 is complete (**). However, if the autostart via the HV electric machine 16 has not completed in the calibrated maximum duration, the method 100 proceeds to step 108 and executes the start via the starter motor 19.

While the best modes for carrying out the invention have been described in detail, those familiar with the art to which this invention relates will recognize various alternate designs and embodiments for practicing the invention within the scope of the appended claims.

The invention claimed is:

1. A vehicle comprising:
   an engine having a crankshaft;
   a transmission having an input member that is selectively connectable to the crankshaft; and
   an electrical system having:
      an auxiliary starter motor connected to the crankshaft;
      a high-voltage (HV) electric machine connected to the crankshaft; and
      a controller having a processor and tangible, non-transitory memory on which is recorded instructions for selecting one of the auxiliary starter motor and the HV electric machine as a source for starting the engine during a requested autostart of the engine using the MGU, wherein execution of the instructions by the processor causes the controller to:
         determine a set of powertrain conditions in response to a requested autostart of the engine, including a crank angle of the engine;
         determine whether the requested autostart will not succeed relative to a time or noise standard using the set of powertrain conditions;
         transmit an autostart command to the HV electric machine when the requested autostart will succeed relative to the time or noise standard; and
         transmit the autostart command to the auxiliary starter motor when the requested autostart will not succeed relative to the time or noise standard.

2. The vehicle of claim 1, further comprising a belt and a pair of pulleys, wherein the HV electric machine is a motor generator unit that is connected to the crankshaft via the belt and the pair of pulleys.

3. The vehicle of claim 1, further comprising a high-voltage energy storage system (HV-ESS) that is electrically connected to the HV electric machine, wherein the set of powertrain conditions includes a state of charge of the HV-ESS.

4. The vehicle of claim 3, further comprising a power inverter module (PIM), wherein the HV-ESS is electrically connected to the HV electric machine via the PIM.

5. The vehicle of claim 1, further comprising a high-voltage energy storage system (HV-ESS) that is electrically connected to the HV electric machine, wherein the set of powertrain conditions includes a power limit of the HV-ESS.

6. The vehicle of claim 1, wherein the set of powertrain conditions includes a torque limit of the HV electric machine.

7. The vehicle of claim 1, wherein the vehicle includes a hydraulic accumulator in fluid communication with the transmission.

8. A controller for a vehicle having an engine, an auxiliary starter motor, and a high-voltage (HV) electric machine each operable to start the engine, the controller comprising:
   a processor; and
   tangible, non-transitory memory on which is recorded instructions for selecting one of the auxiliary starter motor and the HV electric machine as a source for starting the engine during a requested autostart of the engine, wherein execution of the instructions by the processor causes the controller to:
      determine a set of powertrain conditions in response to a requested autostart of the engine using the HV electric machine, wherein the set of powertrain conditions includes a crank angle of the engine;
      determine whether the requested autostart will not succeed relative to a time or noise standard using the set of powertrain conditions;
      transmit an autostart command to the HV electric machine when the requested autostart will not succeed relative to the time or noise standard; and
      transmit the autostart command to the auxiliary starter motor when the requested autostart will not succeed relative to the time or noise standard.

9. The controller of claim 8, wherein the set of powertrain conditions includes a power limit of a high-voltage energy storage system of the vehicle.

10. The controller of claim 8, wherein the set of powertrain conditions includes a torque limit of the HV electric machine.

11. The controller of claim 8, wherein the set of powertrain conditions includes a state of charge of a high-voltage energy storage system (HV-ESS) of the vehicle, a power limit of the HV-ESS, a torque limit of the HV electric machine, and a crank angle of the engine.

12. A vehicle comprising:
   an engine having a crankshaft;
   a belt;
   a pair of pulleys;
   a transmission having an input member that is selectively connectable to the crankshaft; and
   an electrical system having:
      an auxiliary starter motor connected to the crankshaft;
      a polyphase high-voltage energy storage system (HV-ESS);
      an auxiliary power module (APM);
      an auxiliary energy storage system (LV-ESS) electrically connected to one side of the APM;
      a power inverter module (PIM) electrically connected to another side of the APM;
      a high-voltage electric machine in the form of a motor generator unit (MGU) that is connected to the crankshaft via the belt and the pair of pulleys, and electrically connected to the HV-ESS via the PIM; and
      a controller having a processor and tangible, non-transitory memory on which is recorded instructions for selecting one of the auxiliary starter motor and the MGU as a source for starting the engine during a requested autostart of the engine, wherein execution of the instructions by the processor causes the controller to:
         determine a set of powertrain conditions in response to a requested autostart of the engine using the MGU, including a crank angle of the engine and at least one of a state of charge of the HV-ESS, a power limit of the HV-ESS, and a torque limit of the MGU;
         determine whether the requested autostart will not succeed relative to a time or noise standard using the set of powertrain conditions;
         transmit an autostart command to the MGU when the requested autostart will succeed relative to the time or noise standard; and
         transmit the autostart command to the auxiliary starter motor when the requested autostart will not succeed relative to the time or noise standard.

13. The vehicle of claim 12, wherein the set of powertrain conditions includes the state of charge of the HV-ESS, the power limit of the HV-ESS, the torque limit of the MGU, and the crank angle of the engine.

14. The vehicle of claim 12, further comprising a hydraulic accumulator in fluid communication with the transmission.

* * * * *